A. G. KINYON.
CONVEYER FOR COMMINUTED MATERIAL.
APPLICATION FILED SEPT. 5, 1916.
1,258,911.
Patented Mar. 12, 1918.
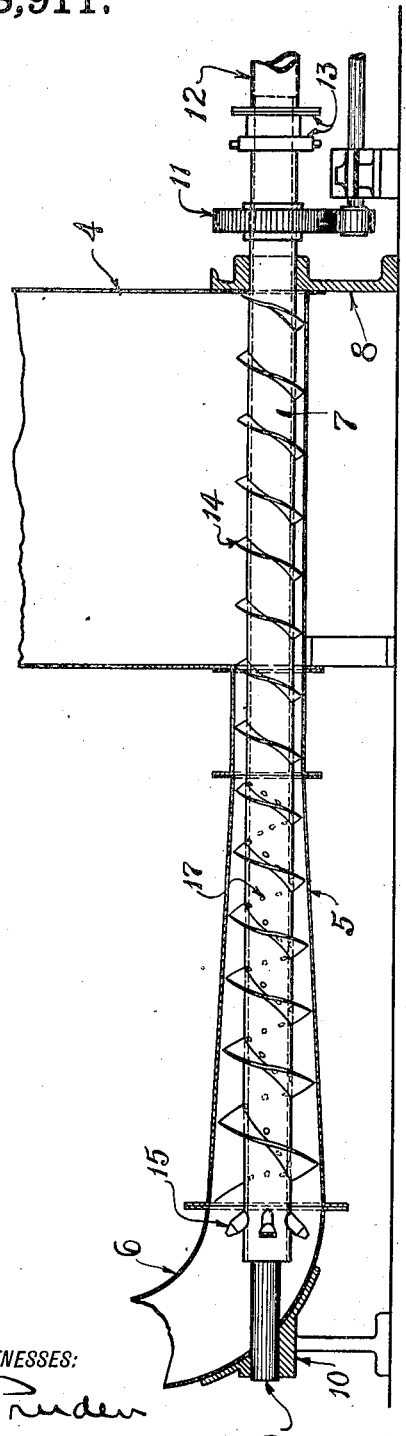
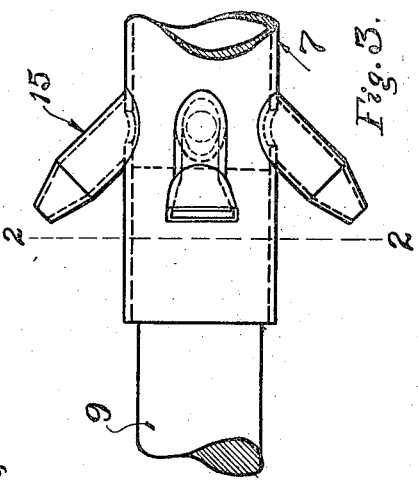
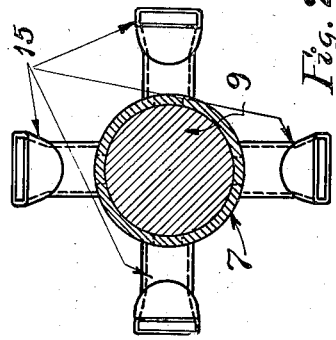
WITNESSES:
INVENTOR
Alonzo G. Kinyon
BY
ATTORNEYS

UNITED STATES PATENT OFFICE.

ALONZO G. KINYON, OF CHICAGO, ILLINOIS, ASSIGNOR TO POWDERED COAL ENGINEERING & EQUIPMENT COMPANY, OF CHICAGO, ILLINOIS, A CORPORATION OF DELAWARE.

CONVEYER FOR COMMINUTED MATERIAL.

1,258,911.  Specification of Letters Patent.  Patented Mar. 12, 1918.

Application filed September 5, 1916. Serial No. 118,554.

*To all whom it may concern:*

Be it known that I, ALONZO G. KINYON, a citizen of the United States, residing at Chicago, in the county of Cook and State of Illinois, have invented certain new and useful Improvements in Conveyers for Comminuted Material, of which the following is a specification.

My invention more particularly relates to screw conveyers and has for its purpose to obviate a difficulty commonly found in conveyers of this class, to wit, that they give an intermittent or pulsating feed rather than a perfectly continuous even flow. In order to equalize the flow of the material and make it perfectly smooth and continuous, I provide means connected with the conveyer for injecting air into the pulverulent material whereby the latter is lightened and more or less suspended in the air, the suspended material more or less completely filling the conduit in which the screw conveyer is located.

My invention is applicable to conveyers for all kinds of finely divided material, but is more particularly useful in those arts in which a perfectly steady, smooth, continuous feed is desirable, as for example, in the feeding of powdered fuel for purposes of combustion.

In the accompanying drawings I have shown and in the following specification described in detail a preferred form of my invention. It is to be understood, however, that the specific disclosure is for the purpose of exemplification only, and that the scope of the invention is defined in the following claims in which I have endeavored to distinguish it from the prior art so far as known to me without, however, relinquishing or abandoning any portion or feature thereof.

In the drawings Figure 1 is a vertical central section of an apparatus embodying my invention, parts being shown in elevation; Fig. 2 is a vertical section of a detail at right angles to the plane of Fig. 1 and on the line 2—2 of Fig. 3 on an enlarged scale; and Fig. 3 is a fragmentary elevation of the parts shown in Fig. 2 on a similar scale.

In the embodiment of the invention shown a hopper 4 is connected by a tapered or flared tube 5, with an upwardly bent elbow 6 which may lead to some receptacle to which material is to be fed from the hopper 4.

A hollow shaft 7 is journaled at one end in a bearing 8 secured to a wall of the hopper, extends through the bottom of the latter and through tube 5, and at its other end receives a solid shaft 9 which is journaled in a bearing 10 attached to the elbow 6. The shaft may be revolved by any suitable means, as by a gear 11, and is connected to an air conduit 12 by a packed joint 13. Conduit 12 leads to any suitable source of air supply, the pressure of which depends upon the character of the material and the speed of movement of the same desired. I have found that for the purpose of feeding powdered fuel for example, a pressure of two to three ounces is in some instances desirable. A spiral blade or worm 14 surrounds the hollow shaft 7 and follows the flare or taper of the tube 5, being larger at the outlet than at the intake end thereof. The hollow shaft is perforated at suitable intervals as at 17, preferably substantially throughout the length of the tapered tube 5 to afford exit for the air in the interior of said shaft to and into the mass of powdered material in the tapered tube. At the end of the shaft are provided a number of forwardly and outwardly directed nozzles 15 likewise communicating with the interior of the hollow shaft and receiving air therefrom.

The hopper 4 may be filled with material in any suitable manner and it is fed into the tapered tube 5 by the revolution of the hollow screw shaft. Within said tube the pulverulent material is impinged upon by the jets of air issuing through the perforations 17 which stir up and mechanically suspend the material in a substantially homogeneous aerated body. The material being fed therefore instead of only partially filling the tapered tube 5, as inflated or suspended by the air, substantially fills the entire cross-section of the tube 5 and is conveyed along the same partially by the air pressure and largely by the spiral vane or blade upon the shaft. As the suspended material emerges from the exit end of the tube 5 it is further urged and propelled along the elbow of tube 6 by the jets of air coming from the revolving nozzles 15. By means of my improved conveyer the powdered material may be fed in a steady, uniform stream without pulsations or interruptions of any kind.

When the device is employed for feeding powdered fuel, the fuel may be taken directly to the furnace or other place where it is to be consumed while mixed with the air, additional air being mingled therewith or not as required.

I claim:

1. A conveyer for finely divided material comprising a conduit, a hollow shaft revolubly mounted longitudinally of the conduit, means for revolving the shaft, said shaft having openings communicating with the interior of the conduit, means for supplying air to the interior of the shaft, and means on the shaft for feeding the material along the conduit and a passage substantially concentric with said conduit for leading the material away therefrom.

2. A conveyer for finely divided material comprising a conduit, a hollow shaft revolubly mounted longitudinally of the conduit, means for revolving the shaft, said shaft having openings communicating with the interior of the conduit, and a screw blade on the shaft for feeding the material along the conduit and a passage substantially concentric with said conduit for leading the material away therefrom.

3. A conveyer for finely divided material comprising a tapered tubular conduit tapered outwardly toward its exit end, a hollow shaft revolubly mounted longitudinally of the conduit and formed with openings communicating with the interior thereof, means for supplying air to the interior of the shaft and a tapered spiral blade on the shaft for feeding the material along the conduit.

4. A conveyer for finely divided material comprising a conduit, a hollow shaft revolubly mounted longitudinally of the conduit and formed with openings communicating with the interior thereof, forwardly projecting nozzles located on said shaft and communicating with the interior thereof, means for supplying air to the interior of the shaft, and spiral means on the shaft for feeding the material along the conduit.

5. A conveyer for finely divided material comprising a conduit, a hollow shaft revolubly mounted longitudinally of the conduit and formed with openings communicating with the interior thereof, forwardly and outwardly directed nozzles arranged on the shaft and communicating with the interior thereof, means for supplying air to said hollow shaft, and means on the shaft for feeding the material along the conduit.

6. In a device of the class described, a hopper, a conduit connected with the hopper and flaring outwardly therefrom, a hollow rotary shaft mounted in the bottom of said hopper and in said conduit, means for rotating the shaft, said shaft being imperforate where it extends through the hopper and perforated in said conduit, means for supplying air to said hollow shaft, and a worm on said shaft which increases in diameter from the inlet to the exit end of said conduit.

ALONZO G. KINYON.